United States Patent [19]

Barham et al.

[11] 3,911,147

[45] Oct. 7, 1975

[54] STEAM CONVERSION PROCESS FOR PRODUCING DEGRADED CEREAL PRODUCTS

[76] Inventors: Harold N. Barham; Harold N. Barham, Jr., both of 3205 46th St., Lubbock, Tex. 79413

[22] Filed: Oct. 6, 1971

[21] Appl. No.: 187,166

Related U.S. Application Data

[63] Continuation of Ser. No. 747,825, July 26, 1968, abandoned.

[52] U.S. Cl. ................ 426/318; 426/510; 426/623; 426/319; 426/626; 426/640; 426/507; 426/511

[51] Int. Cl.² ........................................... A23K 1/00

[58] Field of Search .......... 21/56; 99/2, 80, 10, 216, 99/225, 227, 182, 80 PS, 82, 153, 8; 426/208, 210, 318, 319, 507, 511, 355

[56] References Cited

UNITED STATES PATENTS

| | | | |
|---|---|---|---|
| 2,080,179 | 5/1937 | Merriam et al. | 99/225 |
| 2,237,739 | 4/1941 | Jones | 99/216 |
| 2,653,104 | 9/1953 | Carman | 99/82 |
| 3,528,815 | 9/1970 | Trotter | 99/2 |

FOREIGN PATENTS OR APPLICATIONS

| | | | |
|---|---|---|---|
| 24,912 | 10/1914 | United Kingdom | 99/2 |
| 104,578 | 7/1938 | Australia | 21/56 |

*Primary Examiner*—Norman Yudkoff
*Assistant Examiner*—Curtis P. Ribando
*Attorney, Agent, or Firm*—Sheridan, Ross & Fields

[57] ABSTRACT

A method for the in situ degradation of the tissue polymer content of raw farinaceous materials which comprises subjecting the materials to reduced pressure in a container and flashing steam into the container under high pressure to effect conversion of the grain tissues, the process being particularly effective on raw grain having gases, such as, sulfur dioxide, adsorbed in their inner structure, the product formed having large but dispersible polymers as indicated by the high content of cold and hot water solubles and relatively low reducing sugar values.

26 Claims, No Drawings

STEAM CONVERSION PROCESS FOR PRODUCING DEGRADED CEREAL PRODUCTS

This is a continuation of application Ser. No. 747,825 filed July 26, 1968, now abandoned.

SUMMARY OF THE INVENTION

The invention relates to a method for the in situ degradation of tissue polymers contained in raw grains, more particularly it relates to the degradation of tissue polymers by use of steam under high pressures.

There are many methods available for the treatment of starch after it has been removed from the grain to provide conversion for various applications in industry, such as paper or textile finishing, sizings, adhesives, etc. U.S. Pat. Nos. 2,698,819 and 2,698,936 relate to methods for providing, respectively, dextrinization and condensation products of starch, the final steps in each of the processes of these patents consisting of torrefying a starch product by heating under a vacuum, the processes of these two patents being directed to the production of special starch conversion and condensation products. The treatise teaches the necessity of treatment of starch, dehydration, and the use of long periods of time for conversion.

Other starch degradation processes include the treatment of starch with heated rollers as disclosed in U.S. Pat. No. 1,979,257, and the use of a controlled extrusion-cooking operation after the raw material has been subjected to steam and high temperatures as disclosed in U.S. Pat. No. 3,159,505. The use of heated rolls is slow, involves expensive equipment and results in products varying widely in uniformity of degradation and flake thickness. The starch conversion and condensation processes are directed to the production of special products, varying between narrow limits, and they are relatively expensive.

Prior art degradation and conversion processes have been directed mainly to the degradation of starch after it has been removed from the grain kernel, these processes not being effective for degradation within the kernel structure. Prior art gelatinization processes of farinaceous materials utilizing steam are subject to the disadvantage that they require the addition of significant amounts of liquid water which is expensive to add and remove, and the processes do not provide a high per cent of degradation. Moreover, none of these processes may be directed to in situ polymer degradation within the kernel.

It is an object of this invention to provide an effective process for the degradation of cereal tissue polymers utilizing steam under high pressure.

It is another object of this invention to provide a method for the in situ degradation of the cereal grain tissue polymers of raw farinaceous material.

It is another object of this invention to provide a method for the in situ general degradation of gas impregnated farinaceous material.

It is another object of this invention to provide a highly useful whole grain product containing a high content of starch degradation products as well as a high percentage of the degraded proteinaceous and cellulosic content of the farinaceous materials.

It is another object of this invention to provide a process for manufacturing a product, or products, from farinaceous materials, which are highly utilitarian in use and scope and which yield few or no byproducts.

Still another object of this invention is to provide a method for degrading cereal grain tissue polymers which is easily and completely controlled, is more economically feasible than any other known to be in use as of this date, and is readily applied to cereal grains regardless of origin, all in such a manner so as to better serve markets already established and to satisfy market functions heretofore unattainable.

The above and other objects are obtained by subjecting raw farinaceous material to steam under pressure without the addition of water, other than in the steam, and maintaining the pressure until a product degraded to the desired extent is produced. The invention is peculiarly adapted to the treatment of new farinaceous material which has gases, such as, sulfur dioxide and hydrogen chloride adsorbed throughout its structure. Improvements of the process include flashing steam into an evacuated container holding the farinaceous material, and releasing the steam under pressure in a manner to provide for expulsion of moisture from the farinaceous material.

As used herein the term "grain" includes farinaceous materials in general, and particularly, cereal feed grains, such as corn, grain sorghums, wheat, rice, barley, rye, oats, triticale, millet, and other feed grains for which the term "cereal grains" is generic. The term "raw grain" means grain which has been chemically untreated, other than adsorption of gas into the internal structure and includes whole grain as well as grain which has been ground. It includes grains of a single variety or mixed varieties.

The term "adsorption" is used herein to mean the assimilation of gas into the inner kernel structure of the grain and includes some adsorption of gas. The term "liquid water" is used herein in its ordinary sense as distinguished from gaseous water, or steam. The term "gas" as used herein includes either a single gas or a combination of gases.

The process is applicable to raw whole grain or parts of raw grain made by grinding or otherwise. The majority of examples were performed on whole grain into which sulfur dioxide had been adsorbed by the adsorption process disclosed in our copending application Ser. No. 754,138 filed on July 26, 1968, and although it is peculiarly adapted to grain containing adsorbed gas, it is effective on whole raw grain or parts thereof which do not contain adsorbed gases. The process is operative on raw untreated grain including all of its unseparated components, in contrast to starch treatment processes which are directed to starch per se after it has been separated from the other components of the grain. The process is effective on grain of widely varying moisture content, but it is an advantage of the process that added liquid water is not required, in contrast to conventional grain cooking processes wherein addition of liquid water in amounts up to 30 to 50 per cent moisture content is common. Higher grain moisture levels used in the present process produce products which are similar to those with "as is" moisture but only increase handling problems and costs. As is moisture content, normally present in mature warehouse cereal grains, is usually present in the range of 7 to 16 per cent; 12 to 14 per cent moisture being ordinary.

During the steam conversion step, high quality steam is introduced into the autoclave containing the grain at a rate such that a maximum pressure of 150 p.s.i.g. is reached within about one minute after start. Pressures ranging from 25 to 250 p.s.i.g. can be used; however, generally, those much below 150 p.s.i.g. are not satifactory if the desired degree of degradation of the tissue polymers in the grain is high; for some uses lower pressures may be useful as set forth above. All of the examples below were carried out at pressures between 150 and 250 p.s.i.g., a range which is considerably higher than those normally used in the industry. A preferred pressure range is 85 p.s.i.g. to 250 p.s.i.g.. Peak pressures as low as 40 p.s.i.g. are operative. The total time at any peak pressure is a function of that pressure; for example, when 250 pounds of pressure was used (Examples 1 and 2), the time at that pressure is less than half the time required at 150 p.s.i.g.. A preferred time at 150 p.s.i.g. is from about three to five minutes. Temperatures used correspond to that for steam at the peak pressures.

An optional improvement consists in flashing the steam into an evacuated autoclave containing the grain. Upon charging the autoclave with grain, preferably grain containing adsorbed gas therein, a vacuum is drawn. The higher the vacuum the better, but 24 to 26 inches of vacuum is adequate and can be readily and economically accomplished with a single stage steam ejector. The purpose of the vacuum is to remove interfering air molecules so as to cause greater and more rapid gaseous water adsorption from the steam under reduced pressure, and, therefore, greater adsorption during the low prevailing temperatures. The steam is introduced into the autoclave preferably at a rate such that peak pressure is attained one minute after start of introduction. This is desirable in order to exceed the period of relaxation of the grain. This may be increased somewhat if necessary, but the total time required will be diminished, roughly, by the amount of additional time stretched out to attain maximum pressure.

The pressure is maintained preferably from 3 to 5 minutes and the steam then discharged at about the same rate it was charged into the autoclave. When the steam is released, the water in the grain vaporizes and the desorbed steam is vented. As soon as the prevailing pressure is sufficiently low, the grain is discharged from the autoclave. The complete steaming cycle may be repeated every 10 minutes with another batch of prepared grain; the cycle may be less than 8 minutes when using pressures around 250 p.s.i.g.. The discharged grain gains 1 to 3 per cent moisture, typically to a total of about 16 per cent. Much of the water added through steam may be removed by simple cooling. Thus, an extremely rapid and efficient process has been devised to introduce water into the grain through steam, gelatinize and energize the consequent reaction, and remove the water, all in one short operation. With conventional procedures, such accomplishments are comparatively expensive. When necessary to grind the farinaceous converted product, lower final moistures are desirable to prevent condensation and subsequent reagglomeration of the adhesive material during the process of comminution.

In conventional cooking processes, as stated above, a moisture content from 30 to 50 per cent is used. Normally in these processes, heat is provided to increase the energy level to that sufficient to gelatinize the starch; higher pressures being used only to increase the rate and extent of gelatinization. In the present process, however, the steam is relied upon to furnish both water and energy and permit simultaneous gelatinization and degradation, a unique feature for several reasons. At peak pressure in the present process the grain adsorbs sufficient moisture from the steam to reach 30 to 35 per cent moisture content, but the water adsorbed is sustained at a very high energy level and tends to attain the same temperature as the steam, the high energy contributing to the degradation and gelatinization. The degradation and gelatinization process will work even if the moisture level has been increased to a higher value, but the resulting product is usually not as economically attractive and would not be used unless a high moisture was required to carry out a previous treatment.

When the process is applied to $SO_2$ impregnated grain, and as the temperature and moisture are increased during the period of rapidly increasing steam pressure (from vacuum), chemical reduction occurs as the sulfur dioxide is oxidized to sulfur trioxide. Simultaneously, as the water level is increased, the sulfur trioxide combines with water to become sulfuric acid, whose mode of action is that of hydrolysis. Thus, during the early stages, it is very probable that both reduction and hydrolysis take place with the likelihood that the latter takes place preferentially where the former has taken place, due to location.

There is almost certainly chemical reduction taking place with $SO_2$ oxidized to $SO_3$ and $H_2SO_3$ to $H_2SO_4$. The addition of water during steaming certainly causes the following: $SO_3 + H_2O \rightarrow H_2SO_4$. Not so apparent, however, is the pyrolysis which takes place at the same time. For instance, in one experiment in which no chemicals were used, the steaming step was carried out with grains sorghum (14 per cent moisture) at 150 p.s.i.g. for four minutes. The cold water solubles were just under 50 per cent. With another experiment in which identical, untreated grain sorghum was steamed for 1.5 minutes at 250 p.s.i.g., the resulting cold water solubles were 65.20 per cent. Thus, it is quite plain that pyrolysis had taken place. The temperature achieved with such relatively low moisture is high; however, with a water content of 32 per cent, for example, the maximum temperatures are not as high and less pyrolysis results. Primarily, however, the additional water protects the primary bonds from destruction to the extent that the water is present.

With a peak pressure between zero and 30 p.s.i.g. (for four minutes), the extent of degradation is nil, as evidenced by such criteria as low and virtually unchanged reducing sugar content, low hot and cold water solubility, and low alkali number. Even at 60 p.s.i.g. (four minutes) the degree of degradation is low, with resulting hot water solubility barely exceeding that of a conventionally cooked grain sorghum. When the time element is significantly increased, the results are essentially the same. With 85 p.s.i.g. peak pressure, the preferred lower peak pressure, the degree of degradation is only moderate. From 85 p.s.i.g. upward the degree of degradation progresses well and the time element required is more closely related to the pressure used. At 150 p.s.i.g., the extent of desired reaction is excellent. At any pressure of about 105 p.s.i.g. or greater, the time at which pressure is maintained is a function of the pressure and vice versa. At 150 p.s.i.g. 3 to 5 minutes is adequate; less time results in insufficient degradation for most purposes and additional time is not helpful, may cause undesirable handling problems, and is less desirable economically. At pressures above 150 p.s.i.g. the time is merely decreased. Thus, by controlling the peak pressure, and the time at that peak pressure, excellent control over the degree of degradation is possible.

When HCl impregnated grain is used in conjunction with the conversion process, the basic mode of reaction is somewhat different than that for $SO_2$ impregnated grains, and a somewhat different range of products is produced. Hydrogen chloride is neither oxidative nor reductive but is hydrolytic and may react catalytically. Such a hydrolytic reaction is more severe and extensive than that encountered with sulfuric acid. Historically, it has been found that HCl reactions are difficult to control and have a tendency to break down an increasing proportion of constituents into primary and simple repeating units of which the various polymers are comprised. With the present process, and using whole grain, the solubles are slightly higher and reducing groups somewhat greater, compared to $SO_2$ impregnated grain, exhibiting excellent control. As the degree of particle subdivision is increased, the water solubles increase, and hydrolysis to repeating units is increased markedly. Thus, a wide variety of products are readily available.

In the examples given below illustrating the steam conversion process, whole grain is used in all but one, and the procedure for adsorption of gas into the grain structure precedes the steam conversion step. Accordingly, all of the examples of the process were performed on grain containing adsorbed gas, this being the product to which the process is peculiarly applicable.

When the grain is transferred from the vacuum chamber to the autoclave for steaming it is important, in order to prevent condensation, that the autoclave be preheated to a temperature greater than that which would be obtained with the anticipated peak pressure. In commercial practice such procedure would be inherent in that the equipment would be used repetitiously and frequently.

The examples which follow illustrate but do not limit the invention. In the examples and elsewhere in the specification, all percentages stated are percentages by weight. The percentages of gas and moisture are based on the dry weight of the grain. The weight of the gas adsorbed in all examples was calculated by weight differential, before and after gas exposure. Evacuation was at very low pressure with a mechanical pump. Reducing sugar levels are expressed on the basis of glucose but actually are a measure of terminal reducing groups. As is moisture content usually varies from 7 to 16 per cent of the weight of the grain, and in most of the examples a moisture adjusted to 14 per cent was used for the sake of uniformity and comparison.

EXAMPLE 1

Whole grain sorghum, 149.3 grams with 10.7 per cent moisture, was mixed with 5.7 grams of water to increase the moisture content to about 14 per cent. The tempered grain was then placed in the reaction chamber, hermetically sealed, and subjected to a vacuum (less than 1 inch of absolute pressure). After equilibrium conditions were established, 0.625 grams of sulfur dioxide (0.5 percent) was flashed into the nearly filled chamber increasing the chamber pressure to atmospheric (ca 14.7 p.s.i.a., or 29.92 inches of Hg), requiring 4.0 seconds, after which the flow of gas was stopped. The pressure started to decrease immediately, regaining 77 per cent of the original vacuum within one minute and 91 per cent of said vacuum within 5 minutes and approximating the original vacuum (within 1 inch) at the end of an hour. The color became lighter as the gas was added. The grain remained in the hermetically sealed chamber for a total of 9.75 hours after the chemical addition, all at the prevailing 24° C room temperature, then the vacuum was released and the sample transferred to the preheated autoclave. The autoclave was hermetically sealed and a vacuum established (ca 23 inches of Hg), followed by the injection of steam at such a rate that the peak pressure of 250 p.s.i.g. was attained within 2.5 minutes. This pressure was maintained for an additional 1 minute, and then the steam was exhausted to atmosphere in 1.17 minutes. The discharged grain moisture content was 17.0 per cent. After air drying (75°C) to about 6 per cent moisture, the grain was easily and finely ground by a hammermill. The resulting whole grain product had a reducing sugar content of 1.93 per cent, cold water solubles of 80.40 per cent, and hot water solubles content of 83.49 per cent, all based on the final 5.74 per cent moisture basis.

EXAMPLE 2

155.0 grams of whole grain dent corn with an adjusted moisture content of 14 per cent was used. 0.55 grams of sulfur dioxide (0.4125 per cent) was flashed into the grain-bearing chamber for 5.7 seconds and the flow of gas terminated. The pressure, atmospheric at the instant the gas was shut off, decreased rapidly and the grain color became lighter and brighter. Within one minute, 70 per cent of the original vacuum was recovered and 97 per cent was recovered within the first hour. After 11.75 hours the vacuum was released and the grain transfererd to the preheated autoclave which was hermetically sealed and a vacuum of about 25 inches Hg was imposed thereon followed by the introduction of steam at a rate that the peak pressure of 250 p.s.i.g. was attained in 1.25 minutes, this peak pressure being maintained for an additional 2 minutes. The steam was discharged to atmosphere within 45 seconds leaving the grain sample slightly sticky but generally free flowing when it was removed from the autoclave. The moisture content was reduced from 9.5 to 5.5 per cent by air drying (75°C), the product cooled, and finely ground with ease in a hammermill. The resultant product had a reducing sugar level of 3.45 per cent and cold and hot water solubles content of 81.03 and 84.10 per cent, respectively, based on the final 5.37 per cent moisture content.

EXAMPLE 3

155.0 grams of dehulled whole rice grain having a moisture content adjusted to 14 per cent was used and 0.5 grams of sulfur dioxide was flashed into the chamber, increasing the pressure to atmospheric in a period of 3.0 seconds, and the flow of gas terminated. The pressure started to decrease immediately and the grain lightened somewhat in color. After 1 minute the pressure decreased to 71 per cent of the original vacuum and at the end of one hour had decreased to 97 per cent of the original vacuum. After 1.8 hours with the vacuum being 98 per cent of that originally established, sulfur dioxide was introduced into the chamber again, this time for 1.8 seconds, increasing the pressure from vacuum to 12.3 p.s.i.a., and the flow of gas terminated.

During the second addition 0.3 grams of $SO_2$ was introduced into the chamber making a total of 0.8 grams (0.6 per cent) of gas. No color change occurred during the second addition of sulfur dioxide. Within 1 minute after the cessation of the second addition, 74 per cent of the original vacuum was restored, and 97 per cent was reestablished after one hour. The vacuum was released at the end of 12.4 hours after the second $SO_2$ adsorption and the treated grain transferred to the preheated autoclave which was hermetically sealed and a vacuum of about 26 inches Hg drawn in the autoclave. Steam was fed into the autoclave at such a rate that a peak pressure of 150 p.s.i.g. was attained in 1 minute and the peak pressure was held for an additional 4 minutes after which the steam was released to atmosphere at about the same rate it was introduced. The discharged sample had a moisture content of about 14 per cent which was reduced by air (75°C) to about 5 per cent and then easily ground finely with a hammermill. The resulting product had a reducing sugar value of 1.13 per cent and cold and hot water solubles content of 85.15 and 90.86, respectively, based on the final 4.83 per cent moisture content.

EXAMPLE 4

In this example 155.0 grams of whole grain triticale having an adjusted moisture content of 14 per cent was used. 0.6 grams of sulfur dioxide was flashed into the grain-bearing chamber in 3.8 seconds, increasing the pressure to atmospheric after which the flow of gas was terminated. The color of the kernels of grain lightened immediately. The rate of adsorption was about that described for previous examples. Upon release of the vacuum after 1.8 hours, 99 per cent of the original vacuum was attained, and sulfur dioxide was again introduced into the chamber, this time for 2.7 seconds, increasing the pressure from vacuum to atmospheric, and the flow of gas was terminated. During the second addition of sulfur dioxide, 0.45 grams of gas was introduced making a total of 1.05 grams (0.787 per cent). Within 1 minute after the cessation of the second addition of gas, 56 per cent of the original vacuum was restored and 95 per cent was restored after one hour. At the end of 11.25 hours, the vacuum was released and the sample transferred to the preheated autoclave. After sealing, a vacuum of about 26 inches of Hg was drawn in the autoclave and the steam was introduced at such a rate that a peak pressure of 150 p.s.i.g. was attained within 1.2 minutes and that peak pressure maintained for an additional 4 minutes, after which the steam was exhausted to atmosphere. The discharged grain exhibited the usual medium tan color, was uniform, free flowing and had a moisture content of about 17.7 per cent. After drying to approximately 5.25 per cent moisture (75°C air), the grain was finely ground through a hammermill. The resultant product had a reducing sugar value of 2.53 per cent and cold and hot water solubles content of 75.29 and 82.55 per cent, respectively, all based on the final moisture content of 5.18 per cent.

EXAMPLE 5

149.3 grams of whole grain sorghum having a moisture content of 10.7 per cent was mixed with 9.05 grams of sodium chloride solution which contained 2.667 grams of sodium chloride (2.00 per cent) and 8.08 grams of water and which increased the moisture content to about 15.3 per cent. After tempering the sodium chloride solution, the grain was placed in the reaction chamber which was hermetically sealed and evacuated. 0.6 grams of preweighed sulfur dioxide (0.45 per cent) was flashed into the chamber, increasing the pressure from vacuum to about 14 inches of Hg and requiring 4.6 seconds. The grain lightened in color immediately and the sulfur dioxide was adsorbed rapidly, 90 per cent of the original vacuum being attained within 5 minutes and 98 per cent of the original vacuum being attained within one hour. The vacuum was released after some 40 hours of conditioning and the sample transferred to a preheated autoclave which was hermetically sealed and evacuated to about 26 inches of Hg. Steam was introduced into the autoclave at such a rate that the peak pressure of 150 p.s.i.g. was attained in 60 seconds, this peak pressure being maintained for an additional 4 minutes. Upon release of the steam to the atmosphere, the discharged converted grain had a moisture content of 17.6 per cent, was free flowing and relatively dark in color. After drying to about 7.5 per cent moisture (75°C air) the grain was finely and easily ground with a hammermill. The converted product had a moisture content of 7.47 per cent, a reducing sugar value of 2.35 per cent and cold and hot water solubles of 76.81 and 84.18 per cent, respectively, based on the moisture content of the ground product.

EXAMPLE 6

151.4 grams of grain sorghum offal containing 11.93 per cent moisture was used. The sample was a by-product from the production of grain sorghum brewers' grits and contained all the fractions of the berry not included in the grits, which were essentially small and coherent portions of low-fat endosperm. The moisture content of the offal fraction was adjusted to 14 per cent, and after complete moisture adsorption, the unground and highly cellulosic material was placed in the glass reaction chamber, hermetically sealed, and evacuated. 3.0 grams of sulfur dioxide (2.25 per cent) was flashed into the chamber in a period of 9.9 seconds with the pressure increasing to about 8.4 p.s.i.g. (17 inches of Hg), and the flow of gas terminated. The general hue of the color of the cereal tissue was lightened somewhat instantaneously and the rate of adsorption was extremely rapid. Within an hour after the gas injection, 86 per cent of the original vacuum was restored, due to adsorption, and 90 per cent of the vacuum was reestablished after 15.25 hours at which time the vacuum was released. The sample was transferred to a preheated autoclave which was sealed and evacuated to about 26 inches of Hg.. Steam was then introduced into the autoclave at a rate such as to attain a peak pressure of 150 p.s.i.g. after 75 seconds, this peak pressure being maintained for 4 additional minutes, at which time the steam was released to atmosphere at about the same rate it was introduced. The resulting product contained 16.8 per cent moisture, was free flowing, slightly lumpy, easily handled and uniformly converted. The sample was dried to about 4.0 per cent moisture, cooled, and finely ground through a hammermill. The final product exhibited a reducing sugar value of 4.00 per cent and cold and hot water solubles content of 60.23 and 68.54 per cent, respectively, all based on the final moisture content of 3.75 per cent.

EXAMPLE 7

Whole grain sorghum, 149.3 grams with 10.7 per cent moisture, was mixed with 19.5 grams of water to increase the moisture content to approximately 21 per cent. The tempered grain was placed in a glass reaction chamber, hermetically sealed, and a vacuum imposed on the half-filled chamber. After equilibrium conditions were established, 1.0 grams of sulfur dioxide (0.75 per cent) was flashed into the chamber, increasing the pressure to atmospheric, and requiring 3.7 seconds after which the flow of gas was terminated. The pressure started to decrease instantly with the simultaneous and characteristic bleaching. The rapid adsorption of the gas by the grain exhibited a rate about the same as previous examples, and the chamber had regained about 95 per cent of its original vacuum at the end of the first hour. After 11.4 hours the vacuum was released and the sample was transferred to the preheated autoclave. As soon as the autoclave was hermetically sealed, a vacuum was drawn (about 26 inches Hg), followed by injection of steam at such a rate that the peak pressure of 150 p.s.i.g. was attained in about 50 seconds. The peak pressure of 150 p.s.i.g. was maintained for 4 additional minutes and then the steam was discharged to atmosphere at about the same rate it was introduced. The discharged grain was free flowing, slightly lumpy and had a moisture content of about 20 per cent. The sample was then air dried (at 75°C) to about 6.5 per cent moisture, cooled, and easily reduced in a hammermill. The resulting adhesive product possessed a reducing sugar value of 2.28 per cent, cold and hot water solubles of 70.77 and 83.08 per cent, respectively, all on the final moisture basis of 6.31 per cent.

EXAMPLE 8

155.0 grams of whole grain sorghum having an adjusted moisture content of 14 per cent was used. 0.85 grams (0.638 per cent) of sulfur dioxide was flashed into the reaction chamber in 6.3 second and the flow of gas terminated. The pressure began to drop instantly and the grain color was lightened significantly. 68 per cent of the original vacuum was restored within 60 seconds due to adsorption of sulfur dioxide by the grain and 95 per cent of the original vacuum was reestablished within 1 hour. After 17.5 hours the vacuum was released and the grain transferred to a preheated autoclave which was hermetically sealed, and a vacuum of about 23 inches Hg was established in the autoclave. Steam was seconds into the evacuated autoclave at such a rate that the intended peak pressure of 150 p.s.i.g. was established within only 6 seconds and that peak pressure was maintained for 5 minutes thereafter. The steam was exhausted in 43 seconds and the grain discharged. The converted product, having a 20.5 per cent moisture content, was free flowing, uniform, and slightly sticky. It was dried to about 5.5 per cent moisture content and easily ground to a fine condition in a hammermill. The resultant product, at 5.62 per cent moisture, had a reducing sugar value of 2.15 per cent and cold and hot water solubles content of 72.66 and 84.08 per cent, respectively, based on the as is moisture basis.

EXAMPLE 9

Whole grain sorghum, 209.3 grams with 14 per cent moisture, was used. 1.00 gram of hydrogen chloride (0.556 per cent) was flashed into the evacuated chamber in 2.0 seconds. After termination of gas flow, the pressure started to decrease instantly and rapidly. No significant color change was noted. Within 30 seconds, over 87 per cent of the original vacuum had been recovered and 89 per cent of the vacuum was restored 15 minutes after termination of gas flow. The pressure remained essentially the same for the duration of the 20 hours allotted for total gas adsorption. At the end of the adsorption time the vacuum was released and the sample transferred to the preheated autoclave which was sealed hermetically and a vacuum of 25 inches Hg was drawn. Steam was then injected at such a rate that the peak pressure of 150 p.s.i.g. was attained in about 1 minute, and this pressure was maintained for 4 additional minutes, after which the steam was exhausted to atmosphere at about the same rate it was introduced. The discharged grain was dark colored, uniform, free flowing, and had a "sweet" odor. The converted grain was then air dried at 75°C from about 19 to nearly 4 per cent. The grain was easily ground through a hammermill. The resulting adhesive product was cold water soluble to the extent of 66.38 per cent, based on the final moisture content of 3.59 per cent.

EXAMPLE 10

209.3 grams of whole grain sorghum having an adjusted moisture content of 14 per cent was used. Sulfur dioxide and ammonia was flashed into the evacuated grain-bearing chamber in that order all at room temperature. 0.9 grams of sulfur dioxide was flashed into the container over a period of 24.4 seconds at the end of which time the pressure began to decrease instantly, 43 per cent of the original vacuum being restored within 1 minute, 93 per cent after 1 hour, and 98 per cent re-established at the end of the 11.3 hour adsorption period. 0.4 grams of ammonia was flashed into the evacuated chamber in 3.7 seconds, increasing the pressure to atmospheric. Seven minutes after the gas was shut off, 99 per cent of the vacuum had been recovered and at the end of that short adsorption time ammonia was flashed into the container again, this time for 6.0 seconds delivering 0.42 grams (a total of 0.455 per cent) of ammonia. 81 per cent of the starting vacuum had been recovered within one minute and 102 per cent of that vacuum at the end of the 2.8 hour adsorption period. The final vacuum was 99.5 per cent of the original vacuum, prior to the introduction of sulfur dioxide. At the end of the 2.8 hour adsorption period, after the second ammonia exposure, the vacuum was released and the sample transferred to the preheated autoclave. Immediately after transfer the autoclave was evacuated and steam directed into the autoclave at such a rate that the peak pressure of 150 p.s.i.g. was reached in 1.25 minutes, and this pressure was maintained for an additional 4 minutes. The steam was then exhausted to atmosphere at about the same rate it was introduced. The discharged sample was relatively light in color, free flowing, and uniform. The moisture was reduced from 16.9 to about 4 per cent by air drying at 75°C. The converted grain was easily ground in a hammermill. The resulting product was 55.95 per cent soluble in cold water, based on the final 3.49 per cent moisture.

EXAMPLE 11

209.3 grams of whole grain sorghum, containing an adjusted moisture content of 14 per cent was used. Sulfur dioxide, ammonia, and hydrogen chloride were used, in that order, all at room temperature. 0.9 grams of sulfur dioxide (0.5 per cent) was flashed into the evacuated and hermetically sealed container in 23.8 seconds, increasing the pressure to atmospheric, then the supply of gas was shut off. The pressure started to drop instantly, reaching 49 per cent of the original vacuum within 60 seconds, and 93 per cent of the original vacuum within an hour. At the end of the 14.1 hour adsorption time, 98 per cent of the vacuum had been restored. 0.68 grams of ammonia (0.378 per cent) was flashed into the evacuated chamber, increasing the pressure to atmospheric after 22.1 seconds, at which time the gas flow was terminated. The pressure commenced to decrease instantly, recovering 92 per cent of the starting vacuum after 10 minutes at which time the sample was subjected to another ammonia exposure, this time 0.30 grams being added in 9.2 seconds. A total of 0.98 grams of ammonia was adsorbed (0.544 per cent total). The pressure started to decrease simultaneous with gas flow cessation, 82 per cent of the starting vacuum being reestablished within 1 minute and 99.6 per cent of the starting vacuum within 15 minutes. The gas adsorption period was 28.8 hours, and at the end of this time 1.0 gram of hydrogen chloride was flashed into the evacuated chamber in 9.8 seconds, then the gas flow was shut off. The vacuum was 85 per cent recovered after 15 minutes at which time the second exposure of hydrogen chloride was made. 0.55 grams of hydrogen chloride was flashed into the container in 9.8 seconds (1.55 grams, or 0.861 per cent in all). Again, at the instant the gas supply was shut off the pressure began to drop. After 18.1 hours adsorption time the starting vacuum was 70 per cent recovered after which time the vacuum was released and the grain transferred to the preheated autoclave. Immediately, the pressure in the autoclave was reduced to about 26 inches Hg, then steam was introduced at such a rate that the peak pressure of 150 p.s.i.g. was attained within 1.17 minutes. The 150 p.s.i.g. pressure was maintained for four minutes and then exhausted to atmosphere at about the same rate it was introduced. The converted grain was free flowing and very dark in color. At 75°C the sample was air dried from 16.7 to 4.0 per cent moisture. The resulting product, easily ground through a hammermill, was 59.46 per cent cold water soluble, based on the final 3.28 per cent moisture content.

EXAMPLE 12

209.3 grams of grain sorghum, containing an adjusted moisture content of 14 per cent, was used. Both sulfur dioxide and hydrogen chloride, in that order, were used. The grain was placed in a container, hermetically sealed, and evacuated. After equilibrium conditions were established, 0.89 grams of sulfur dioxide (0.49 per cent) were flashed into the container in 24.1 seconds, after which the flow of gas was stopped. The pressure started to decrease immediately and rapidly so that within 1 minute 53 per cent of the vacuum had been restored and 96 per cent of the vacuum had been recovered by the end of the 19.1 hours adsorption time. Hydrogen chloride was flashed into the evacuated chamber (0.61 grams, or 0.33 per cent) for 4.6 seconds, then the gas flow terminated. The following adsorption was very rapid with 87 per cent of the starting vacuum recovered in 60 seconds and 95 per cent regained within 1 hour. After an 18.3 hour adsorption time, and with the vacuum 94 per cent of that just prior to the hydrogen chloride exposure, the vacuum was released. The grain was transferred to the preheated autoclave, the autoclave evacuated to about 25 inches Hg, steam was introduced into the autoclave at a rate such that the peak pressure of 150 p.s.i.g. was attained within 1.33 minutes and that pressure maintained for 4 additional minutes. The steam was then exhausted to atmosphere at about the same rate it was introduced, and the grain removed. The discharged sample was free flowing, relatively dark in color, and uniform. After drying from about 13 to about 4 per cent moisture by air at 75°C, the sample was cooled, and easily ground through a hammermill. The adhesive product was 78.40 per cent cold water soluble, based on the final 3.70 per cent moisture content.

The grains used in the examples included grain sorghum, rice, triticale, and grain sorghum offal. The process is effective on all cereals without exception. The moisture content of the grains used varied from 11.93 to 21 per cent before steam conversion, and the moisture content of the converted product varied from 9.5 to 20.5 per cent. Peak pressures ranged from 150 to 250 p.s.i.g.; the time used to attain these peak pressures varied from 6 seconds to 2.5 minutes. The time for maintenance of peak pressure ranged from 1 to 5 minutes and the time used for exhaustion of steam varied from 45 seconds to 1.33 minutes. The reducing sugar values, cold water solubles content, hot water solubles content of the final products, based on their final moisture content after drying and cooling, varied, respectively, from 1.13 to 4.00, 55.95 to 85.15, and 68.54 to 90.86 per cent. In all but four of the examples, the cold water solubles content of the product exceeded 70 per cent, and in all of the examples except one in which the hot water solubles content was available it exceeded 80 per cent.

The gases with which the treated grains were impregnated were sulfur dioxide, hydrogen chloride, sulfur dioxide and ammonia, sulfur dioxide with ammonia and hydrogen chloride, and sulfur dioxide with hydrogen chloride. Other gases may be used, such as, ammonia, hydrogen sulfide, chlorine, ethylene, ethylene oxide, and combinations of these gases with each other and with sulfur dioxide and hydrogen chloride.

Examples 10, 11 and 12 illustrate the application of the conversion process to grains which have adsorbed two or more gases, the cold water solubles content of the products illustrating the efficacy of the process in this application. These examples illustrate the application of the process for promoting a chemical reaction in situ between two or more gases adsorbed into the kernel structure to provide an end product in the grain kernel. For example, if the desired reaction is primarily reduction, in lieu of reduction and subsequent hydrolysis as encountered with sulfur dioxide, ammonium sulfite may be substituted by adsorbing ammonia first, then sulfur dioxide. For slightly varied results, the chemicals may be reversed in their order of adsorption. As another example, hydrogen sulfide may be adsorbed if there are reasons to employ the reduced form of sulfur instead of the oxidized form, sulfur dioxide. Both are reducing agents; both exhibit a bleaching effect on whole grain.

As an illustration of overall cereal tissue degradation, consider Example 6 wherein grain sorghum offal was used. The raw material, a by-product from the production of grain sorghum brewers' grits, is principally bran with some germ and minor proportions of endosperm. The cold and hot water solubles were over 60 per cent and while not quite so high as the other examples, the values are higher than can be accounted for by the starch content. The reducing sugar values were still quite low at 4.00 per cent, indicating the presence of large polymers and relatively few small or short polymers.

Among the advantages of the process is that it provides a product for direct animal feeding in which vastly improved utilization of the inherent nutritive value of the treated grain is realized over that for the untreated grain. For example, in the case of the whole grain sorghum treated with sulfur dioxide and then subjected to steam conversion, after the grain had dried to a storable level of about 12 per cent moisture, samples were placed in the rumen of a fistulated steer, using the nylon bag technique. Unlike ordinary whole kernels, where about 4 to 7 per cent disappearance was noted in 48 hours, 92 per cent disappearance was observed for the treated grain in 24 hours, a striking contrast. The various cereal tissue polymers are in a state of significantly greater and more rapid availability. The feasibility of direct animal feeding thus becomes self-evident and is greatly enhanced by the economy of production mandatory in such a competitive endeavor.

After the grain is discharged from the autoclave, it must be cooled; or, in the case of grain substantially greater than 16 per cent moisture, dried and then cooled. Following that procedure there is no urgency whatever to perform any additional processing steps since the product is extremely stable and may be stored indefinitely. It may be shipped as processed grain in bulk, or it may be ground and packaged before shipment. Due to the chemical degradation many internal vector forces have been relieved or eliminated; the response to practically every type of conventional grinding is excellent illustrating a significant improvement over that encountered with untreated grain and a vast improvement as compared to grain which is simply gelatinized.

The product odors are interesting and useful. With steam converted cereal grains, having first been impregnated with sulfur dioxide, the odors have a striking likeness to cereal grains having been coated with molasses. The odors are molasses-like whether in whole grain form, farinaceous form, or ground whole converted grain. When sulfur dioxide and ammonia combinations are used, the odor is unmistakably that of fresh roasted peanuts, the degree apparently depending on the amounts and proportions of those gases used. With HCl the odor is frequently sweet and somewhat "acid", the degree depending upon the amount of gas used and degree of degradation which is dependent on the numerous controlling factors. While such pleasant odors may not be particularly useful for some purposes it is a well-established fact that molasses is attractive to animals, especially ruminants. Moreover, the readily available energy of the product of this invention is considerably greater than the same weight of molasses.

The uniform and appropriate physical properties of the product, along with the very low cost of production, heretofore not possible, combine into a fortuitous set of circumstances which provide markets previously unavailable. Products made by prior art processing, which are degraded to about the same extent as the present product, are available, but are prohibitively expensive for certain markets because of the lengthy time elements involved, cost of pure polymers, high moisture requirements necessary, uniformity difficulties, and the like. The low projected price of the present product, including a reasonable and proper margin of profit, opens the way to serve new markets.

One such market is for a nutritive binder for animal feed pellets. Generally, a pellet binder is desirable for many feedstuffs mixtures to provide tough pellets, resistance to crumbling, and to increase the through-put per pellet machine. Ideally, a pellet binder should be effective (as stated), inexpensive, nutritive, and readily available. Thus far, no product has been offered which has satisfied all requirements and most products offered for the purpose have enjoyed no significant portion of the potential market whatever. Calcium lignosulfonate, a paper manufacturing byproduct, is probably the most efficient binder currently marketed, but it is considered to be of little nutritional value by most authorities and is not allowed to be used in feedstuffs in excess of 4 per cent. According to numerous tests conducted, the product from the present process satisfies all requirements, can be used in any proportion, including 100 per cent, and is at least as efficient and more economical than calcium lignosulfonate. The economy of production will allow the product to be offered consistent with the generally low profit, high volume industry. The fact that the product is not hygroscopic, yet imbibes water very rapidly and is largely water soluble makes it attractive as a nutritive pellet binder, because during the process of feed pelleting, the product has only about 6 seconds to adsorb sufficient moisture to become effectively adhesive.

Feeding tests, using rats, have indicated strongly that when supplemented with protein the product produced significantly better growth rates than the same grain which had not been processed but which was protein supplemented in like manner.

Another use for the products of the steam conversion process invention are as a replacement for molasses used as a carrier in liquid fed supplements. Considering the solubility, the compatability with the usual accompanying chemicals, solids content attainable, and the possibility of shipment in dry form, according to feasibility tests, the product is expected to be a strong and inexpensive competitor for this use.

Other uses for the product are as an adjunct in the manufacture of gypsum wallboard, and as a binder for various products, such as foundry cores, charcoal briquettes, taconite pellets, and other related and similar uses which are generically the same or similar to those functions performed in binding feed pellets.

In gypsum wallboard production, a modified raw starch or dextrinized raw flour is commonly added to the wet gypsum stucco mix just prior to casting to improve the adhesion of paper to the core as the starch migrates toward the surface of the core during drying. It is also believed that the farinaceous materials aid in controlling the rate of gypsum crystal formation. Further, there is evidence to support the belief that a material with cold water solubles greater than the 10 to 35 per cent range currently being supplied would enhance the rate of wallboard production, a dominating factor in the profitability for wallboard manufacturers. The present product has been tested for this use and has demonstrated an efficacy which is very promising. Should a manufacturer desire somewhat different properties to suit individual plant manufacturing operations, product characteristics may be altered to satisfy the requirements because of inherent flexibility and utility.

It is to be understood that this invention is not limited to the exact embodiments of the methods shown and described, which are merely by way of illustration and not limitation, as various other forms and modifications will be apparent to those skilled in the art, and it is therefore intended that the appended claims cover all such changes and modifications.

We claim:

1. A process for making cereal grain products from raw whole cereal grains having the internal structures thereof more available for use, said grains having adsorbed into the grain kernel structure a reactive gas selected from the group consisting of sulfur dioxide, hydrogen chloride, ammonia, chlorine and mixtures thereof, which process comprises: subjecting said gas adsorbed grain to steam under a peak pressure of at least 85 p.s.i.g. to promote chemical reaction between said gases or their reaction products with the kernel structure to produce a cereal grain product.

2. The process of claim 1 in which the adsorbed gas is present in an amount of at least 0.1 percent by dry weight of the raw cereal grain.

3. The process of claim 1 in which the steam is brought to peak pressure in over a period at least about six seconds after steam introduction has been initiated.

4. The process of claim 3 in which a pressure of at least 85 p.s.i.g. is maintained for at least one minute.

5. The process of claim 1 in which the gas is sulfur dioxide.

6. The process of claim 1 in which the gas is hydrogen chloride.

7. The process of claim 1 in which the gas is a combination of sulfur dioxide and ammonia.

8. The process of claim 1 in which the gas is a combination of sulfur dioxide, ammonia and hydrogen chloride.

9. The process of claim 1 in which the gas is a combination of sulfur dioxide and hydrogen chloride.

10. A process for making a cereal grain product from raw whole cereal grain so that the internal structure of said grain is more available for use, said process comprising:

a. adsorbing into the kernel structure of said raw whole cereal grain at least 0.1 percent by weight of at least one reactive gas from the class consisting of sulfur dioxide, hydrogen chloride, ammonia, chlorine, and mixtures thereof; and b. subjecting said gas adsorbed raw whole cereal grain to steam under pressure of at least 85 p.s.i.g. for at least two minutes.

11. The process of claim 10 in which the steam is brought to a peak pressure of at least 85 p.s.i.g. in a period of at least six seconds and maintained at a pressure of at least 85 p.s.i.g. for at least one-half minute.

12. A whole cereal grain product made from raw whole cereal grain so that the internal structure of said grain is more available for use and having reducing sugar values, cold water solubles content and hot water solubles content, respectively, from 0.93–4.00 55.95–85.15 and 68.54–90.86 percent by weight.

13. A process for making cereal grain products from raw whole cereal grains having the internal structures thereof more available for use, said grains having adsorbed into the grain kernel structure a reactive gas selected from the group consisting of sulfur dioxide, hydrogen chloride, ammonia, chlorine and mixtures thereof, which process comprises: subjecting said gas adsorbed grain to steam under a peak pressure of at least 85 p.s.i.g. up to about 250 p.s.i.g. to promote chemical reaction between said gases or their reaction products with the kernel structure to produce a cereal grain product.

14. The process of claim 13 in which the adsorbed gas is present in an amount of at least 0.1 percent by dry weight of the raw cereal grain.

15. The process of claim 13 in which the steam is brought to peak pressure over a period of at least about 6 seconds after steam introduction has been initiated.

16. The process of claim 15 in which a pressure of at least 85 p.s.i.g. is maintained for at least 1 minute.

17. The process of claim 13 in which the peak pressure of the steam is between 85–250 p.s.i.g.

18. The process of claim 13 in which the gas is sulfur dioxide.

19. The process of claim 13 in which the gas is hydrogen chloride.

20. The process of claim 13 in which the gas is a combination of sulfur dioxide and ammonia.

21. The process of claim 13 in which the gas is a combination of sulfur dioxide, ammonia and hydrogen chloride.

22. The process of claim 13 in which the gas is a combination of sulfur dioxide and hydrogen chloride.

23. A process for making a cereal grain product from raw whole cereal grain so that the internal structure of said grain is more available for use, said process comprising:

a. adsorbing into the kernel structure of said raw whole cereal grain at least 0.1 percent by weight of at least one reactive gas from the class consisting of sulfur dioxide, hydrogen chloride, ammonia, chlorine, and mixtures thereof; and b. subjecting said gas adsorbed raw whole cereal grain to steam under pressure of between a pressure of about 85 250 p.s.i.g. for at least two minutes.

24. The process of claim 23 in which the steam is brought to a peak pressure of at least 85 p.s.i.g. in a period of at least 6 seconds and maintained at a pressure of at least 85 p.s.i.g. for at least one-half minute.

25. A process for making a cereal grain product from raw whole cereal grain so that the internal structure of said grain is more available for use, said grain having adsorbed into the grain kernel structure at least 0.1 percent by dry weight of the raw whole cereal grain a gas selected from the group consisting of sulfur dioxide, hydrogen chloride, ammonia, chlorine, and mixtures thereof, which process comprises:

a. placing the gas adsorbed raw whole cereal grain in a pressure vessel;

b. introducing steam into the pressure vessel;

c. bringing the steam to a peak pressure between 85–250 p.s.i.g. over a period of at least about six seconds; and d. holding the steam at a pressure of at least 85 p.s.i.g. for at least about one minute.

26. The method of making cereal grain products from raw whole cereal grain so that the internal structure of said grain is more available for use, said process comprising:

a. placing raw whole cereal grain in a pressure vessel;

b. evacuating said pressure vessel;

c. introducing into the pressure vessel at least one reactive gas selected from the group consisting of sulfur dioxide, hydrogen chloride, ammonia and chlorine, and mixtures thereof to adsorb into the kernel structure of the grain at least 0.1 percent of the gas based on the dry weight of the cereal grain;

d. introducing steam into the pressure vessel at a pressure between about 85 and about 250 p.s.i.g.; and e. maintaining the pressure in the pressure vessel until the grain has a specified reducing sugar value and cold and hot water solubles content.

* * * * *